US011729473B2

(12) United States Patent
Phillips et al.

(10) Patent No.: US 11,729,473 B2
(45) Date of Patent: *Aug. 15, 2023

(54) MEDIA ASSET RATING PREDICTION FOR GEOGRAPHIC REGION

(71) Applicant: Spherex, Inc., Santa Clara, CA (US)

(72) Inventors: Teresa Ann Phillips, Los Altos, CA (US); Pranav Anand Joshi, Cerritos, CA (US); Kira Michelle McStay, Los Angeles, CA (US)

(73) Assignee: SPHEREX, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,426

(22) Filed: Jun. 14, 2022

(65) Prior Publication Data

US 2022/0385977 A1 Dec. 1, 2022

Related U.S. Application Data

(63) Continuation of application No. 17/336,199, filed on Jun. 1, 2021, now Pat. No. 11,399,214.

(51) Int. Cl.
*H04N 21/45* (2011.01)
*H04N 21/475* (2011.01)
*H04N 21/466* (2011.01)

(52) U.S. Cl.
CPC ..... *H04N 21/4756* (2013.01); *H04N 21/4524* (2013.01); *H04N 21/4665* (2013.01)

(58) Field of Classification Search
None
See application file for complete search history.

(56) References Cited

U.S. PATENT DOCUMENTS

| | | |
|---|---|---|
| 9,363,561 B1 | 6/2016 | Harmon et al. |
| 10,339,574 B2 | 7/2019 | Muller et al. |
| 10,643,074 B1 | 5/2020 | Mcaninly et al. |
| 10,671,854 B1 | 6/2020 | Mahyar et al. |
| 10,848,791 B1 | 11/2020 | Germano et al. |
| 10,897,649 B1 | 1/2021 | Germano et al. |
| 10,897,658 B1 | 1/2021 | Sethu et al. |
| 2008/0168486 A1 | 7/2008 | Song et al. |
| 2010/0287584 A1 | 11/2010 | Starikov et al. |
| 2016/0307244 A1 | 10/2016 | Muller et al. |
| 2018/0332347 A1 | 11/2018 | Hamiti et al. |
| 2018/0376205 A1 | 12/2018 | Oswal et al. |
| 2019/0373322 A1 | 12/2019 | Rojas-echenique et al. |

FOREIGN PATENT DOCUMENTS

AU 2008205164 A1 7/2008

*Primary Examiner* — William J Kim
(74) *Attorney, Agent, or Firm* — Schwegman Lundberg & Woessner, P.A.

(57) ABSTRACT

Various embodiments described herein support or provide for predicting a rating for a media asset for one geographic region based on a reference rating of the media asset for another geographic region.

21 Claims, 6 Drawing Sheets

MEDIA ASSET RATING PREDICTION FOR GEOGRAPHIC REGION

RELATED APPLICATIONS

This application is a continuation of U.S. application Ser. No. 17/336,199, filed Jun. 1, 2021, which application is incorporated herein by reference.

TECHNICAL FIELD

The present disclosure relates generally to media assets, and, more particularly, various embodiments described herein provide for systems, methods, techniques, instruction sequences, and devices that facilitate predicting a rating for a media asset for one geographic region based on a reference rating of the media asset for another geographic region.

BACKGROUND

The worldwide explosion of direct streaming and over-the-top (OTT) services on a wide range of platforms (e.g., online, mobile, and Connected TV (CTV)) gives any content creator's products global potential. Films, TV shows, documentaries, and live events can now reach new markets and generate additional revenue for everyone in the production chain. For example, content created in one geographic region (e.g., country and territory) can immediately seek distribution in over two hundred other geographic regions (e.g., countries and territories) with the potential to reach a diverse array of consumers encompassing thousands of cultures and sub-cultures. However, fulfilling that potential can be a challenge.

Most of geographic regions (e.g., countries and territories) have formal cultural compliance and censorship rules that each media asset (e.g., movie title) crossing their borders and seeking exhibition authority must adhere to. This means that regulators, content creators, and distributors usually share a mutual responsibility to ensure that country laws, cultures, and norms are respected. With over hundreds of thousands of movie titles being released each year, it has become a challenge for humans alone to accurately and responsibly assess each movie title seeking distribution in the international market.

Additionally, the fact that there is no agreed-upon global standard for rating video content makes things even more of a challenge. For instance, some geographic regions regulate film, but not television or streaming content. This can result in a significant volume of distinctly different rules that content creators and distributors must follow to successfully obtain ratings allowing their work to be shown in other countries. This is in addition to any language, cultural, or religious sensitivities they must also navigate to obtain distribution approval.

Cultural sensitivity is another factor that can seriously impact rating video content. For instance, issues like drug addiction, rape, child abuse, and suicide can be seen differently by different cultures, and those differences should be taken into consideration for rating purposes. This means that creators and distributors have the burden of learning the unique cultural knowledge required to navigate international regulations in their target markets. Additionally, creators cannot release video content without a rating, and the regulator cannot assign a rating without a review.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
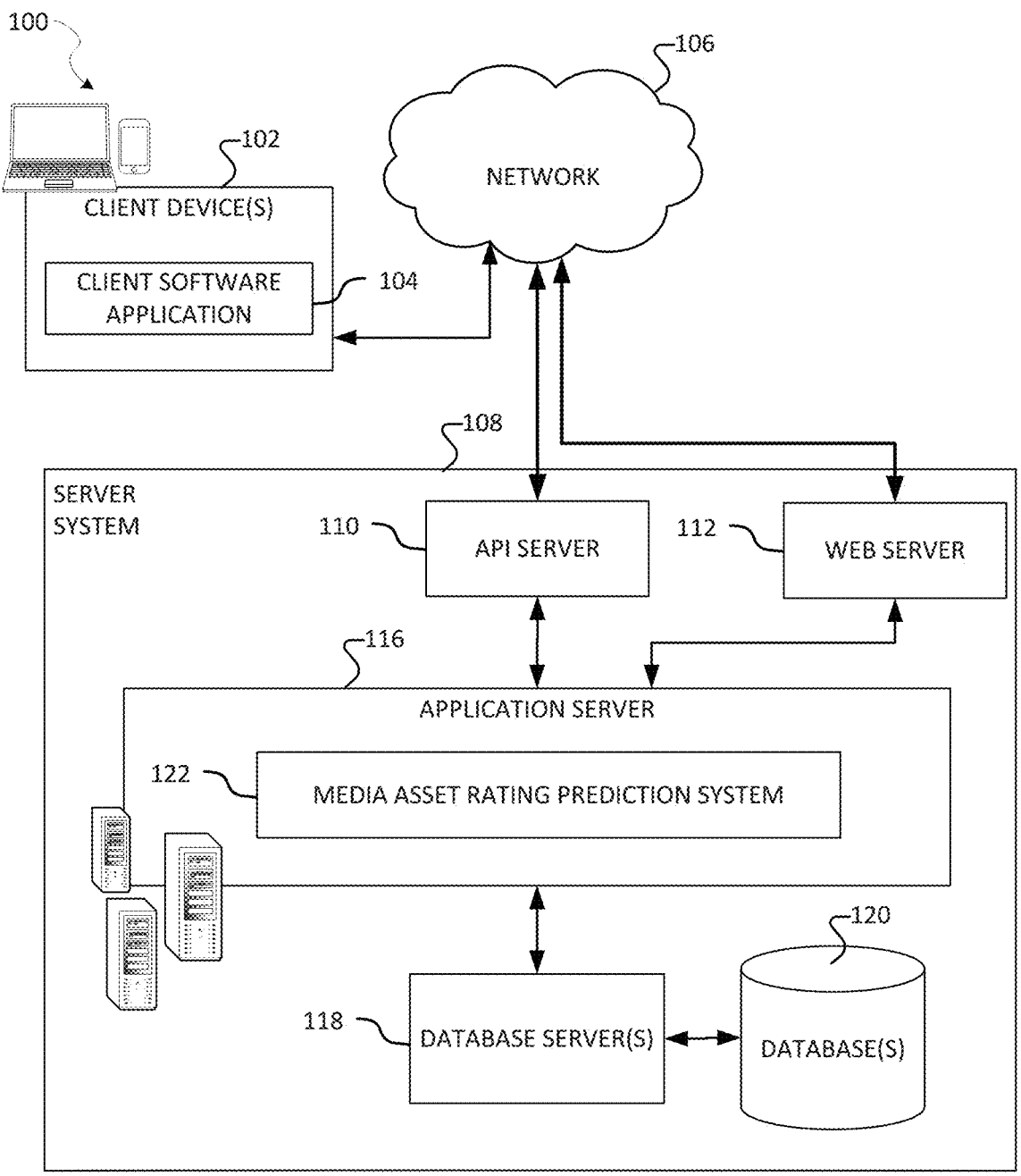
FIG. 1 is a block diagram showing an example data system that includes a media asset rating prediction system, according to various embodiments of the present disclosure.

In film and media, many geographic regions (e.g., countries and territories) have issued regulations regarding classifications of film and television content based on their respective cultures. These regulations raise several distinct challenges. First, the rules can lack context. Second, the rules are usually subject to human interpretation, requiring judgement calls when film and television content are screened for classification—this can result in inconsistent ratings of titles. Third, the rules go through changes when real-world scenarios are encountered post-classification. Fourth, in scenarios where it is difficult to choose between rating categories (i.e., should a title be rated PG or PG-13), the rules generally do not specify "what can't be included" in content to serve as a determining factor (e.g., tiebreaker between PG and PG-13). This can render transforming (e.g., mapping) a reference rating associated with one geographic region (e.g., a first country) to a rating associated with another geographic region (e.g., a second country).

Various embodiments described herein address these and other deficiencies of the conventional art by predicting a rating for a media asset for one geographic region based on a reference rating (e.g., an actual or predicted rating that already exists) of the media asset for another geographic region. For example, various embodiments use machine learning (ML) and artificial intelligence (AI) to determine the predicted rating for a first geographic region based on the reference rating for a second geographic region. The predicted rating can be one selected from a plurality of ratings applicable to the first geographic region (e.g., in the United States, the Motion Picture Association (MPA) rating system), and the reference rating can be one selected from a plurality of ratings applicable to the second geographic region (e.g., in Saudi Arabia, the General Commission for Audiovisual Media (GCAM) rating system). For some embodiments, the predicted rating is determined by transforming the reference rating in view of contextual data of the media asset and geographic region rules (e.g., inference rules associated with the second geographic region). The reference rating can be one actually determined for the first geographic region by an agency/governing body of the first geographic region, or can be one predicted for the first geographic region based on some other methodology. In this way, the reference rating can serve as an initial rating for the media asset from which to transform and determine the predicted rating.

An embodiment can comprise an ML-based rules engine that uses descriptive rule discovery to curate rules (e.g., regulations) for geographic regions (e.g., countries). Some embodiments generate a comprehensive library of data that facilitates curation of the rules, where the comprehensive library can be generated by mining of policy manuals, historical literature, current affairs, judiciary decisions on sensitive topics (e.g., LGBTQ (lesbian, gay, bisexual, transgender and queer), sexual violence, self-harm, blasphemy, religious practices, depiction of drugs and alcohol in media content, etc.), or grievances raised by audiences (e.g., in the form of news articles). The comprehensive library can be implemented as a knowledge graph database (e.g., a geographic region rules knowledge graph database), which can serve as a data store for mined and curated rules used by the ML-based rules engine.

For some embodiments, the ML-based rules engine serves as the controller for determining how geographic region-specific rules can be accurately applied to events identified within a given media asset (e.g., emotional events found within a movie title) events, which can enable transformation of a rating of the media asset from a first geographic region to a second geographic region. According to some embodiments, a rating transformation process comprises identifying one or more events in content of a media asset, where each event has one or more attributes at a feature level, which can be implemented as one or more classes and sub-classes. For instance, where an event (in content of a media asset) involves violence (e.g., class/sub-class level), an embodiment can determine whether there is no blood, some blood, and/or significant blood. Subsequently, the rating transformation process can identify a frequency and an intensity of events of a given event type (e.g., event of a certain class and sub-class). Frequency of events of a given event type can comprise a numeric value that represents the number of occurrences of the events within content of the media asset. Intensity of events of a given event type can be determined based on repetition of, or distance between, events of the given even type. Repetition of events of a given event type can comprise a numeric value that represents the number of repeated occurrences of the same event. Distance between events of a given event type can be determined (e.g., calculated) based on how close or far-apart are the events on the content timeline of the media asset. Intensity of an event of a given event type can be determined based on an event setting of the event. For example, if an event involves "Bullying of a minor" and the setting is a "School," then the intensity can be determined to higher on a scale (e.g., a scale of zero to five). Likewise, if an event involves "Alcohol and Drugs usage," and a "Minor" is involved, then the intensity of that event can be determined to be higher on the scale. Information used to determine frequency or intensity of one or more events of a media asset can be provided by contextual data for the media asset. Depending on the embodiment, the contextual data can be generated or captured in a number of different ways. For instance, annotation of events of the media asset or an online questionnaire as described herein. Additionally, the frequency determination can be part of an analytical component, and the repetition and distance between the events can be used by an intensity predictor. One or both of the analytical component and intensity predictor can be implemented by a ML model.

Eventually, based on the determined frequency and intensity for events of a given event type, the rating transformation process can generate (e.g., compute) an impact score for the given event type. Using the generated impact score, a ML algorithm (e.g., ML rules engine) can generate a rating score for events of the given event type. Based on the generated rating score for the given event type, an initial rating associated with the first geographic region for the media asset can be transformed to a predicted rating associated with the second geographic region for the media asset. Based on predicted ratings for one or more event types, an overall rating associated with the second geographic region can be determined for the media asset. Based on the generated rating score for the given event type, a content advisory (associated with the given event type) can be determined for the media asset. The one or more content advisories that are determined for the media (for different event types found in content of the media asset) can represent a set of content advisories (e.g., an overall listing of content advisories) that is applicable to the media asset.

Furthermore, an embodiment can determine a set (e.g., listing) of timestamps for events (or timestamp ranges for scenes) that are associated with (e.g., contribute to) the predicted rating of the media asset. A separate set of timestamps (or a separate set of timestamp ranges) can be determined for a given event type, and can be associated with the predicated rating determined with respect to (e.g., based on) the given event type.

The set of timestamps or ranges of timestamps can be used for, or by, one or more utilities that performed with respect to a media asset. For instance, the set of timestamps or ranges of timestamps can be used in compliance reviewing/editing content of the media asset, which can enable review or edit content of the media asset with respect to complying with rules of specific geographic region or with respect to achieving a specific rating or set of content advisories for the media asset. The compliance editing can comprise automated method in which technology is used to recommend the respective time-code ranges of non-compliant scenes within the media asset for local markets worldwide. In general, content exhibition in local markets can be regulated to ensure compliance with content classification and censorship laws. When a particular content fails to comply with local policies, regulators can require that objectionable scenes be edited accordingly.

In other instances, the set of timestamps or ranges of timestamps can be used for, or by, one or more of trailer generation or audience segmentation and targeting. Trailer generation can comprise an automated method in which a trailer is generated using artificial intelligence and machine learning technology that indexes and packages the most relevant scenes of content of the media asset. In general, a trailer can comprise a commercial advertisement of a video content that is planned for exhibition—usually for films and television shows. Using the set of timestamps or ranges of timestamps, a trailer can be generated that meet a target rating for a geographic region, or avoids one or more certain content advisories.

Audience segmentation and targeting can comprise an automated method in which consumers can be profiled according to demographics, psychographics, gender, age, ethnicity, or other parameters, and consumers within a target audience or cohort can be identified (e.g., for enhanced marketing promotions and conversions) for the media asset. Using the set of timestamps or ranges of timestamps, content of the media asset can be reviewed or edited to reach/target a certain audience for the media asset.

Use of an embodiment described herein can not only facilitate prediction of ratings, content advisories, or both for media assets across multiple geographic regions (e.g., multiple international regions or territories), but can also facilitate such predictions so that they can be performed accurately, consistently, and at scale (e.g., to handle the number of movie titles being created and released on an annual basis).

As used herein, a geographic region can include a continent, a global region, a country, a territory, or a jurisdiction. A given geographic region can have a set of rules or regulations that govern or limit distribution or viewership of content of a media asset within the geographic region. Additionally, a given geographic region can have an agency or governing body (e.g., in the United States, the Motion Picture Association (MPA)) that determines one or more ratings (e.g., audience maturity ratings or maturity ratings) or advisories with respect to a media asset, which can limit or restrict who (e.g., by age) can purchase or view content of the media asset within the geographic region. For example, in the United States, movie title content ratings that can be applied to a media asset (e.g., movie title) can include general audiences (G) where content of the media asset is viewable by individuals of all ages, parental guidance suggested (PG) where content may not be suitable for children, parents strongly cautioned (PG-13) where content of the media asset may be inappropriate for children under the age of 13, restricted (R) where content of the media asset is viewable by individuals under the age of 17 but only with a parent or adult guardian, and adults only (NC-17) where content of the media asset is only viewable by individuals over the age of 16.

As used herein, a rating of a media asset can indicate a minimum maturity level (e.g., a minimum age) of an individual who wants to view the content of the media asset. The rating can comprise a maturity rating or a content rating. A given rating can be associated one or more geographic regions. With respect to a given geographic region, a rating for a media asset can be selected from a plurality of ratings defined by a rating system (e.g., motion picture content rating system) associated with the given geographic region. For example, the rating system can be defined or managed by an organization, agency, or governing body associated with the given geographic region, such as the Motion Picture Association (MPA) in the United States, General Commission for Audiovisual Media (GCAM) in Saudi Arabia, or Film Censorship Board (LPF) in Malaysia.

As used herein, a content advisory for a media asset can indicate a textual or symbolic advisory regarding content that is presented by the media asset. Generally, a media asset can have one or more content advisories, and each can serve as a warning to an audience member regarding what content will be presented by the media asset (e.g., which can assist an audience member or their parent/guardian in making an informed decision regarding viewing the media asset). For example, a listing of content advisories can comprise one or more textual or symbolic advisories that indicate that content of a media asset contains the following: "Violence of high impact, including realistic suicide; realistic sex and use of illegal drugs; strong profane language." The one or more content advisories determined for a given media asset can differ for difference geographic regions. The content advisory for a media asset can be selected from a plurality of content advisories defined by an organization, agency, or governing body. Different geographic regions can used different pluralities of content advisories that are applicable to a given media asset (e.g., based on laws, regulations, culture, religion, etc.).

As used herein, an event can comprise an audio content element (e.g., music, background noise, etc.), a visual content element (e.g., video, visual effects, colors, etc.), a textual content element (e.g., subtitles), a speech content element (e.g., dialog during an event or over a scene), or some combination thereof, that occurs within (e.g., is presented by) content of a media asset at a particular point on a timeline (e.g., a particular timestamp or timecode) of the media asset. For instance, a given event can comprise one or more of noise generated, music played, items displayed, actions or activity displayed by an actor, or words spoken. As used herein, an emotional event can refer to an event that has the possibility of invoking an emotional response in an audience member who observes or experiences the event.

As used herein, a scene can comprise multiple events that occur within (e.g., are presented by) content of a media asset over a duration of a timeline (e.g., a range of timestamps or timecodes) of the media asset. As used herein, timestamp and timecode are used interchangeably.

As used herein, a machine learning (ML) model can comprise any predictive model that is generated based on (or that is trained on) training data. Once generated/trained, a machine learning model can receive one or more inputs (e.g., one or more features) and generate an output for the inputs based on the model's training. Different types of machine learning models can include, without limitation, ones trained using supervised learning, unsupervised learning, reinforcement learning, or deep learning (e.g., complex neural networks). As used herein, a rule-based ML algorithm can uses ML-based techniques to find regularities in data that can be expressed in the form of an "IF-THEN" programming rule. This kind of rule discovery can be either descriptive or predictive, where descriptive rule discovery can describe significant patterns in the given dataset in terms of rules, and where predictive rule discovery can focus learning a collection of rules that conjointly cover a given space.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a media asset rating prediction system, according to various embodiments of the present disclosure. By including the media asset rating prediction system 122, the data system 100 can facilitate prediction of a rating for a media asset for a first geographic region based on a reference rating of the media asset for a second geographic region as described herein. In particular, a user at the client device 102 can access the media asset rating prediction system 122 (e.g., via a graphical user interface presented on a software application on the client device 102) and use the media asset rating prediction system 122 to predict a rating (for a media asset, such as a video asset or an audio asset) associated with a first geographic region based on a reference rating (for the media asset) associated a second geographic region, where one or more of the media asset, the reference rating, the first geographic region (associated with the reference rating), and the second geographic region is selected by the user through the client device 102.

According to some embodiments, the media asset rating prediction system 122: accesses contextual data that describes one or more events in content of the media asset (e.g., user selected media asset), where the one or more events of one or more event types; accesses inference rules for a given event type and associated with the first geographic region; determines a frequency weight value based on frequency of events of the given event type and based on a first inference rule; determines an intensity value based on events of the given event type and based on a second inference rule; determines an impact score for the given event type based on the frequency weight value, the intensity value, and a third cultural inference rule; uses a machine learning algorithm to generate a rating point value for the given event type for the second geographic region based on the impact score; and generates a predicted rating associated with the second geographic region by transforming the reference rating to the predicted rating based on the rating point value. For some embodiments, the media asset rating prediction system 122 generates a content advisory associated with the second geographic region for the media asset based on the rating point value. Additionally, for some embodiments, the media asset rating prediction system 122 determines a set (e.g., listing) of timestamps for events (or timestamp ranges for scenes) that are associated with (e.g., contribute to) the predicted rating. As noted, the set of timestamps or ranges of timestamps can be used by various utilities used on the media asset, such as compliance reviewing/editing content of the media asset.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the data system 100 are described herein as being performed by the media asset rating prediction system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 performs methodologies described herein.

The server system 108 supports various services and operations that are provided to the client software application 104 by the media asset rating prediction system 122. Such operations include transmitting data from the media asset rating prediction system 122 to the client software application 104, receiving data from the client software application 104 to the media asset rating prediction system 122, and the media asset rating prediction system 122 processing data generated by the client software application 104. This data may include for example, requests and responses relating to enable or facilitate generation of a predicted rating of a media asset, a content advisory of the media asset, a set of timestamps for events associated with the predicted rating, or ranges of timestamps for scenes associated with the predicted rating. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the media asset rating prediction system 122. The application server 116 is communicatively coupled to a database server 118, which facilitates access to a database 120 that stores data associated with the application server 116, including data that may be generated or used by the media asset rating prediction system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the media asset rating prediction system 122 of the application server 116 including, without limitation, one or more of the following: accessing contextual data for a media asset; determining a frequency weight value for events within the media asset; determining intensity value for events within the media asset; determining an impact score for events within the media asset based on the frequency weight value and the intensity value; generating a rating point value by a machine learning algorithm based on the impact score; generating a predicted rating associated with a select geographic region based on a reference rating associated with an initial geographic region and the rating point value; generating a content advisory for the media asset based on the rating point value; and providing a set of timestamps for events (or ranges of timestamps for scenes) that are associated with (e.g., contribute to) the predicted rating.

The application server 116 hosts a number of applications and subsystems, including the media asset rating prediction system 122, which supports various functions and services with respect to various embodiments described herein.

The application server 116 is communicatively coupled to a database server 118, which facilitates access to database(s) 120 in which may be stored data associated with the media asset rating prediction system 122. Data associated with the media asset rating prediction system 122 can include, without limitation, data describing one or more events identified in content of a media asset, one or more event classification labels identified for events, one or more event subclassification labels identified for events, one or more inference rules for different geographic regions; or territory rules or knowledge data. At least some of the data used by the media asset rating prediction system 122 can be structured as graph data.

Figure 2:
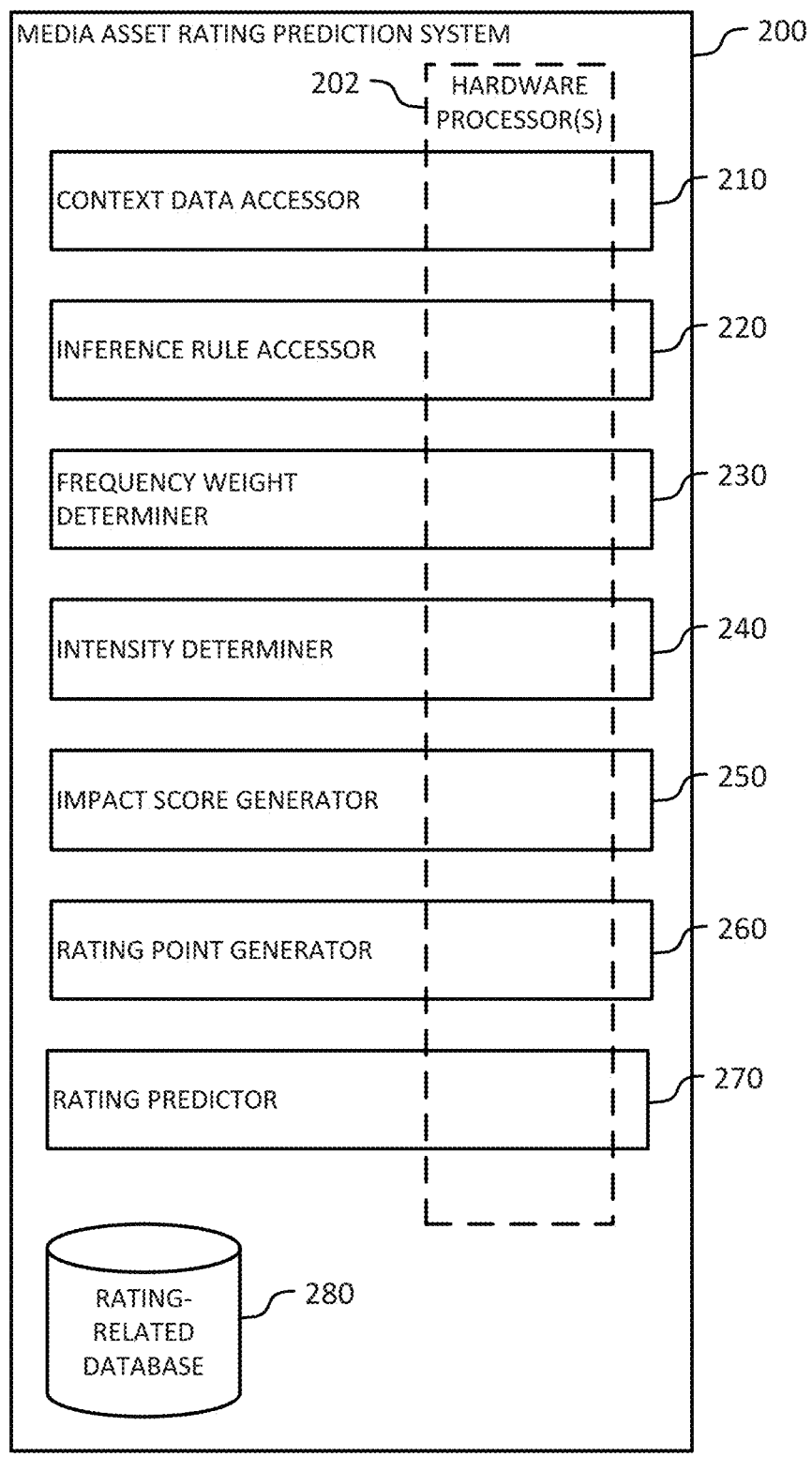
FIG. 2 is a block diagram illustrating an example media asset rating prediction system, according to various embodiments of the present disclosure.

FIG. 2 is a block diagram illustrating an example media asset rating prediction system 200, according to various embodiments of the present disclosure. For some embodiments, the media asset rating prediction system 200 represents an example of the event-based data system 100 described with respect to FIG. 1. As shown, the media asset rating prediction system 200 comprises a context data accessor 210, an inference rule accessor 220, a frequency weight determiner 230, an intensity determiner 240, an impact score generator 250, a rating point generator 260, a rating predictor 270, and a rating-related database 280. According to various embodiments, one or more of the context data accessor 210, the inference rule accessor 220, the frequency weight determiner 230, the intensity determiner 240, the impact score generator 250, the rating point generator 260, and the rating predictor 270 are implemented by one or more hardware processors 202. Data (e.g., contextual data for a media asset) generated by, or used by, one or more of inference the context data accessor 210, the inference rule accessor 220, the frequency weight determiner 230, the intensity determiner 240, the impact score generator 250, the rating point generator 260, and the rating predictor 270 is stored a rating-related database 280 (or datastore) 280 of the media asset rating prediction system 200.

The context data accessor 210 is configured to access contextual data for a current media asset (such as an audio asset or a video asset), where the contextual data describing a set of events within content data of the current media asset. The contextual data can be structured as graph data. For various embodiments, the current media has a reference rating associated with an initial geographic region, which can eventually be used to determine one or more predicted ratings or one or more content advisories. Depending on the embodiment, the initial geographic region can comprise a country or territory, and the predicted ratings or content advisories can be associated with one or more other geographic regions (e.g., target regions or regions of interest), each of which can be comprise a different country or territory. The initial geographic region can be one from which the current media asset originated (e.g., where it was originally created or released). The reference rating associated with the initial geographic region can comprise an actual rating issued by an organization of the initial geographic region (e.g., maturity rating issued for the current media asset by MPA in the United States) or one predicted for the initial geographic region (e.g., predicted using a proprietary methodology).

As described herein, an event can comprise an audio content element, a visual content element, a textual content element, a speech content element, or some combination thereof, that occurs within content of a media asset at a particular point on a timeline (e.g., a particular timestamp or timecode) of the media asset. One or more of the set of events can each be associated with a class and one or more sub-classes that provide context for the event. The contextual data can describe an association between an event and event class (e.g., event classification label) and one or more event sub-classes (e.g., event sub-classification labels). The event classes and event subclasses associated with events can be ones defined by a predetermined event classification ontology or taxonomy, which can be defined (e.g., configured with classes and subclasses) such that contextual information can be determined (e.g., extracted) from the media asset in a manner that reduces or avoids cultural bias. For example, using events that are classified based on event classes and event subclasses of the predetermined event classification ontology/taxonomy, some embodiments can determine (e.g., extract) contextual information regarding those events as they relate to, for example, alcohol, blasphemy, cinematography, discrimination, horror, imaginary, LGBTQ (lesbian, gay, bisexual, transgender and queer), nudity, violence, political extremism, profanity, sex, and violence. One or more event subclasses identified for a given event can be determined based on an event classification associated with the given event. The classified and subclassified events of a media asset can enable determination of other contextual information for the media asset, such as contextual information regarding scenes in content of the media asset (where each scene comprises one or more events), contextual information regarding themes presented in the content, title-level contextual information for the media asset, and the like. As used herein, a given event type can comprise an event class (or event classification), or can comprise a combination of event class and one or more event sub-classes (or event sub-classifications).

At least some portion of the contextual data can be generated for the current media asset by determining (e.g., identifying) one or more of details with respect to content of the current media asset, where such details can represent annotations that enable determination (e.g., extraction) of contextual information for the current media asset. Details determined (e.g., identified) can include, without limitation: events; event classification labels for events; event subclassification labels for events; scenes comprising events; attributes of scenes; themes presented by the content; and title-level attributes of the given media asset. For some embodiments, the determined (e.g., extracted) contextual information represents information that has been determined while reducing or removing cultural biases from reviewing and annotating media assets. The determination of such details can be facilitated by one or more machine-learning models that are trained to identify such details.

For some embodiments, at least a portion of the contextual data is generated based on an online questionnaire completed for the current media asset by a human reviewer. For instance, a questionnaire associated with one or more geographic regions can be completed by a human reviewer, who may or may not have screened the content data of the current media asset as part of the process. From a fully or partially completed questionnaire, an embodiment can extract contextual information (from responses made in the questionnaire) regarding the content data of the current media asset, such as one or more events present in the content data or the given event types present in the content data.

In another embodiment, at least a portion of the contextual data is generated based on a source for catalog content for media assets. For example, catalog content can apply Natural Language Processing (NLP) or computer vision technology to extract, translate, interpret, analyze, normalize, and contextualize data from various relevant data sources, such as local maturity ratings, classification entities, digital streaming platforms, critic reviews on domestic, international, and aggregated sites (e.g., IMDB, ROTTEN TOMATOES, METACRITIC, WIKIPEDIA).

The inference rule accessor 220 is configured to access a set of cultural inference rules for a given event type (e.g., an inference rule associated with a given event class and one or more event subclasses of the event class) for a select geographic region (e.g., target region or region of interest) for which a predicted rating, a content advisory, or both is sought), where the content data of the current media asset comprises one or more events of the given event type (e.g., comprising a combination of LGBTQ class, and kissing subclass, and male subclass). The set of cultural inference rules can be accessed from a graph data structure (e.g., graph database). For some embodiments, the set of cultural inference rules (associated with the select geographic region) includes a cultural inference rule that comprises a frequency threshold (e.g., used by the frequency weight determiner 230) that determines the frequency weight value based on the frequency of the one or more events of the given event type. For some embodiments, the set of cultural inference rules includes a cultural inference rule that defines how an intensity value is determined (e.g., by the intensity determiner 240) based on intervals between, or repetition of, events of the given event type. Additionally, for some embodiments, the set of cultural inference rules includes a cultural inference rule (e.g., used by the impact score generator 250) that determines how a frequency weight value (of the given event type) and an intensity value (of the given event type) are used to generate an impact score for the given event type.

The frequency weight determiner 230 is configured to determine (e.g., identify), for the current media asset, a frequency weight value of the given event type based on a frequency at which one or more events of the given event type (e.g., comprising a combination of LGBTQ class, and kissing subclass, and male subclass) occur within the content data and based on a first cultural inference rule from the set of cultural inference rules. As noted herein, the first cultural inference rule can comprise a frequency threshold that determines the frequency weight value based on the frequency (e.g., number) of the one or more events of the given event type. The frequency of events of the given event type can comprise a numeric counter that maintains the number of occurrences of events of the given event type.

The intensity determiner 240 is configured to determine (e.g., identify), for the current media asset, intensity value of the given event type based on the one or more events and a second cultural inference rule from the set of cultural inference rules. As noted herein, the second cultural inference rule can define how the intensity value is determined based on intervals between, or repetition of, events of the given event type within content of the current media asset. For example, the intensity determiner 240 can determine a count of events of the given event type that occur within a time period defined by the second inference rule, and the intensity determiner 240 can determine at least a part of the intensity value of the given event type based on that count (e.g., the count being a proxy for indicating an intensity of events of the given event type). By determining a time distance between events of the given event type, the intensity determiner 240 can determine how close or far-apart are the events of the given event type on the timeline of the media asset.

The impact score generator 250 is configured to generate, for the current media asset, an impact score for the given event type based on the frequency weight value (e.g., provided by the frequency weight determiner 230), the intensity value (e.g., provided by the intensity determiner 240) for the given event type, and a third cultural inference rule from the set of cultural inference rules. As noted herein, the third cultural inference rule can define how a frequency weight value (of the given event type) and an intensity value (of the given event type) are used to generate the impact score for the given event type. For instance, the third cultural inference rule can indicate how the frequency weight value and the intensity value are weighted and combined to generate the impact score for the given event type. For some embodiments, the impact score can comprise a value on a scale of how impactful events of the given event type are for the select geographic region. For instance, the scale can range from 0 to 5, where a value of 0 represents no impact and a value of 5 represents high impact.

The rating point generator 260 is configured to using a machine learning (ML) algorithm to generate (for the current media asset) a rating point value for the given event type for the select geographic region based on the impact score provided by the impact score generator 250. For some embodiments, the rating point generator 260 uses a ML algorithm, which can be trained on geographic region-specific data, such policy manuals, historical literature, current affairs, judiciary decisions on sensitive topics, or grievances raised by audiences. The ML algorithm can receive as input the impact score for the given event type and generate the rating point value for the given event type for the select geographic region. For some embodiments, the ML algorithm used by the rating point generator 260 comprises a ML-based rules engine. For example, based on the geographic region-specific data, the ML-based rules engine can use descriptive rule discovery to curate rules (e.g., regulations) for geographic regions (e.g., countries). Additionally, the ML-based rules engine can be configured to apply one or more rules, discovered for one geographic region, as proxy for one or more other geographic regions that lack corresponding or equivalent rules. This application of proxy rules can be a trained behavior of the ML-based rules engine. For some embodiments, the rating point value score can comprise a value on a scale, where the scale represents how much influence events of the given event type found in content of the current media asset will have in determining a rating for the current media asset for the select geographic region.

The rating predictor 270 is configured to determine (e.g., identify), for the current media asset, a predicted rating associated with the select geographic region by transforming the reference rating to the predicted rating based on the rating point value generated by the rating point generator 260. For some embodiments, the rating predictor 270 maps the reference rating to the predicted rating based on the rating point value. As described herein, the predicted rating can be one select from a plurality of ratings associated with the select geographic region (e.g., one provided by an agency or governing body of the select geographic region). Eventually, the rating predictor 270 can determine an overall predicted rating associated with the select geographic region for the media asset based on one or more predicted ratings (associated with the select geographic region) determined for one or more given event types found in the content of the current media asset. For instance, in connection with the select geographic region, where the rating predictor 270 determines a plurality of predicted ratings (e.g., PG, PG-13, and R) for different event types present in the content for the current media asset, the rating predictor 270 can determine that the overall predicted rating (associated with the select geographic region) for the current media asset is the most restrictive rating in the plurality of predicted ratings (e.g., rating of R under the MPA rating system).

For some embodiments, the rating predictor 270 is configured to determine a content advisory for the media asset based on the rating point value for the given event type. For instance, where the given event type indicates violence and blood, based on the rating point value, the rating predictor 270 can determine a content advisory (e.g., content advisory code) for the select geographic region relating to the violent and blood content. As described herein, the content advisory can be one select from a plurality of content advisories associated with the select geographic region (e.g., one provided by an agency or governing body of the select geographic region). Alternatively, where the select geographic region does not have a plurality of content advisories to choose from, a content advisory can be generated by the rating predictor 270 based on the given event type (e.g., event class and even subclasses that define the given event type).

Figure 3:
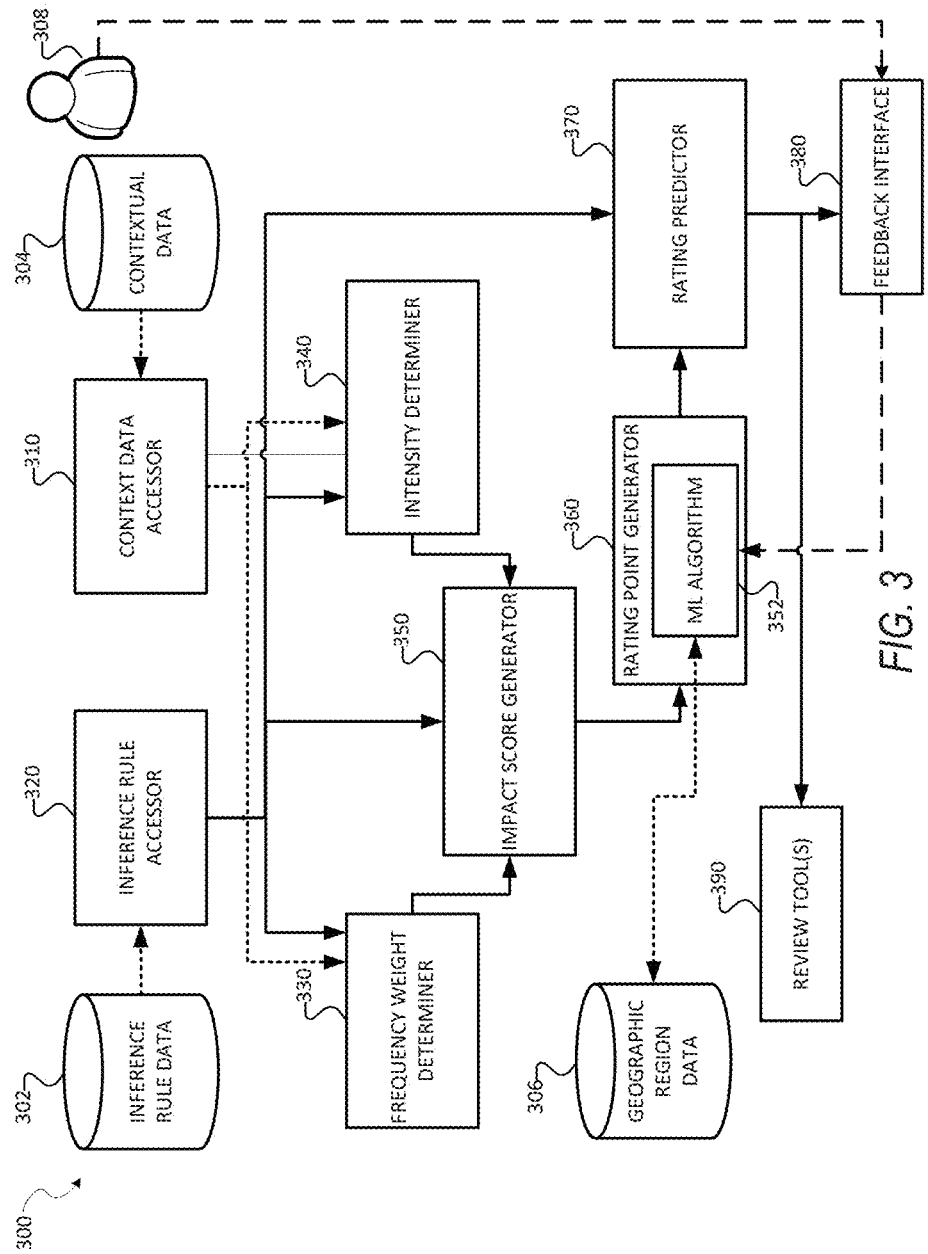
FIG. 3 is a flowchart illustrating data flow within an example media asset rating prediction system during operation, according to various embodiments of the present disclosure.

FIG. 3 is a flowchart illustrating data flow within an example media asset rating prediction system 300 during operation, according to various embodiments of the present disclosure. As shown, the media asset rating prediction system 300 comprises a context data accessor 310, an inference rule accessor 320, a frequency weight determiner 330, an intensity determiner 340, an impact score generator 350, a rating point generator 360, a rating predictor 370, a feedback interface 380, and one or more review tools 390 of the media asset rating prediction system 300 of FIG. 3. According to various embodiments, the context data accessor 310, the inference rule accessor 320, the frequency weight determiner 330, the intensity determiner 340, the impact score generator 350, the rating point generator 360, and the rating predictor 370 are similar to the context data accessor 210, the inference rule accessor 220, the frequency weight determiner 230, the intensity determiner 240, the impact score generator 250, the rating point generator 260, and the rating predictor 270 of the system 200 described with respect to FIG. 2.

During operation, contextual data 304 for a media asset (e.g., video media asset) is accessed by the context data accessor 310, where the contextual data describes (e.g., identifies) one or more events of one or more event types (e.g., different event class and event subclass combinations) in the content of the media asset. The media asset can have a reference rating associated with a first geographic region, which can represent a geographic region from where the media asset originated (e.g., was created and originally released). Where a user is interested in determining a predicted rating for a select geographic region, the inference rule accessor 320 access, from inference rule data 302, a set of inference rules for the select geographic region for a given event type (from the one or more event types present in the content of the media asset).

The frequency weight determiner 330 receives from the inference rule accessor 320 a first inference rule, and receives from the context data accessor 310 information regarding one or more events of a given event type in the content of the media asset. The frequency weight determiner 330 determines (e.g., identifies), for the media asset, a frequency weight value of the given event type based on a frequency at which one or more events of the given event type occur within the content of the media asset and based on the first cultural inference rule, which can define a frequency threshold for determining the frequency weight value based on the frequency of the one or more events.

The intensity determiner 340 receives from the inference rule accessor 320 a second inference rule, and receives from the context data accessor 310 information regarding one or more events of a given event type in the content of the media asset. The intensity determiner 340 determines (e.g., identifies), for the media asset, intensity value of the given event type based on the one or more events and the second cultural inference rule, which can define how the intensity value is determined based on intervals (e.g., distance) between, or repetition of, events of the given event type within the content of the media asset.

The impact score generator 350 receives from the inference rule accessor 320 a third inference rule, receives from the frequency weight determiner 330 the frequency weight value for the given event type, and receive from the intensity determiner 340 the intensity value of the given event type. The impact score generator 350 generates, for the media asset, an impact score for the given event type based on the frequency weight value, the intensity value for the given event type, and the third cultural inference rule, which can define how the frequency weight value and the intensity value are used (e.g., weighted and combined) to generate the impact score for the given event type.

The rating point generator 360 receives the impact score for the given event type from the impact score generator 350 and uses a machine learning (ML) algorithm 352 (e.g., ML-based rules engine) to generate (for the media asset) a rating point value for the given event type and for the select geographic region based on the impact score of the given event type. As noted herein, the machine learning algorithm 352 can receive as input the given even type and the impact score (for the given event type) and, in response, can output the rating point value for the given event type. As shown, the ML learning algorithm 352 can use geographic region data 306 (e.g., rules discovered by the ML-based rules engine during training) to generate and output the rating point value.

Eventually, the rating predictor 370 receives the rating point value of the given event type and transforms (e.g., maps) the reference rating (for the media asset) associated with the initial geographic region to a predicted rating (for the media asset) associated with the select geographic region. The rating predictor 370 can determine an overall rating (for the media asset) associated with the select geographic region based on a plurality of predicted ratings determined for a plurality of event types present in the content of the media asset. Additionally, based on the given event type and the rating point value, the rating predictor 370 can determine one or more content advisories for the media asset.

The predicted rating of the given event type (or the overall predicted rating) can be accessed (e.g., or viewed) by, or presented to, a user 308. With respect to the predicted rating of the given event type (or the overall predicted rating), the feedback interface 380 can receive user feedback from the user 308, which can be used to retrain or update the machine learning algorithm 352. For instance, with respect to the given event type, the user feedback can comprise an adjustment to the predicted rating determined for the given event type (e.g., providing a more accurate rating) that can be fed back to the machine learning algorithm, which in turn can result in one or more adjustments to the rules of applied by the machine learning algorithm (e.g., adjusted behavior of the machine learning algorithm 352 and corresponding change in the rating point value generated).

The review tools 390 can receive (e.g., from the rating predictor 370) one or more predicted ratings for one or more different event types, one or more content advisories, or a set of timestamps corresponding to the one or more events of one or more event types present in content of the media asset. This (and possibly other) information provided to the review tools 390 can facilitate various review or editing of the media asset by one of the review tools 390. For instance, the set of timestamps or ranges of timestamps can be used for, or by, one of the review tools 390 to facilitate compliance reviewing/editing content of the media asset, to facilitate generation of a trailer for the media asset, or to facilitate audience segmentation and targeting for the media asset.

Figure 4:
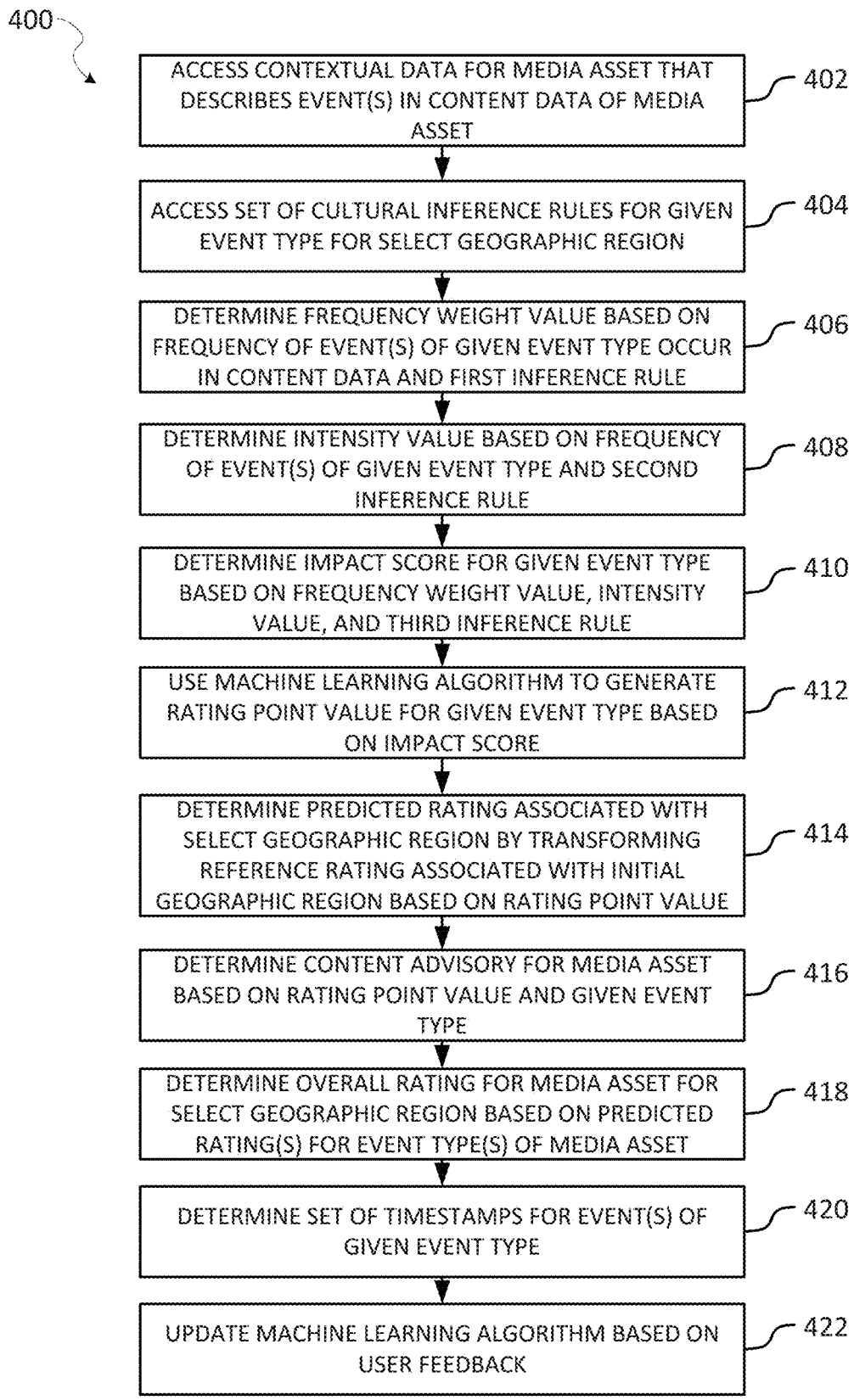
FIG. 4 is a flowchart illustrating an example method for predicting a rating for a media asset, according to various embodiments of the present disclosure.

FIG. 4 is a flowchart illustrating an example method 400 for predicting a rating for a media asset, according to various embodiments of the present disclosure. It will be understood that example methods described herein may be performed by a machine in accordance with some embodiments. For example, the methods 400 can be performed by the media asset rating prediction system 122 described with respect to FIG. 1, the media asset rating prediction system 200 described with respect to FIG. 2, the media asset rating prediction system described with respect to FIG. 3, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of the method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, contextual data for a media asset is accessed by (e.g., using) a hardware processor (e.g., hardware process operating the media asset rating prediction system 200), where the contextual data describes a set of events within content data of the media asset. The contextual data can describe a set of event classification labels determined for the set of events and a set of event subclassification labels determined for the set of events, where a select event type of a select event in the set of events is defined by a combination of an event classification label associated with the select event and an event subclassification label associated with the select event. The contextual data can be generated based on an online questionnaire completed for the current media asset by a human reviewer. Additionally, the contextual data can be generated based on a source for catalog content for media assets.

For various embodiments, one or more of operations 404 through 416 are performed for each event type identified in the content data of the current media asset. As described herein, a given event type can comprise an event class (or event classification), or can comprise a combination of event class and one or more event sub-classes (or event sub-classifications).

For one or more events (in the set of events) of a given event type, at operation 404, a set of cultural inference rules for the given event type is accessed by the hardware processor, where the set of cultural inference rules being associated with the select geographic region. At operation 406, a frequency weight value of the given event type is determined by the hardware processor based on a frequency at which the one or more events (of the given event type) occur within the content data of the media asset, and based on a first cultural inference rule from the set of cultural inference rules (accessed at operation 404). The first cultural inference rule can comprise a frequency threshold that determines (e.g., determines how) the frequency weight value based on the frequency at which the one or more events (of the given event type) occur within the content data of the media asset. Additionally, at operation 408, an intensity value of the given event type is determined by the hardware processor based on the one or more events (of the given event type) and based on a second cultural inference rule from the set of cultural inference rules (accessed at operation 404). The second cultural inference rule can define how the intensity value is determined based on intervals between, or repetition of, events of the given event type within the content data of the media asset.

Subsequently, at operation 410, an impact score for the given event type is generated by the hardware processor based on the frequency weight value of the given event type (determined by operation 406), the intensity value of the given event type (determined by operation 408), and a third cultural inference rule from the set of cultural inference rules (accessed at operation 404). The third cultural inference rule can define how the frequency weight value and the intensity value are used to generate the impact score. For instance, the third cultural inference rule can indicate how the frequency weight value and the intensity value are weighted and combined to generate the impact score for the given event type. Based on the impact score, at operation 412, a machine learning algorithm is used by the hardware processor to generate a rating point value for the given event type for the select geographic region. Depending on the embodiment, the machine learning algorithm can comprise a machine learning-based rules engine, which during training can use descriptive rule discovery to curate rules (e.g., regulations) for the select geographic regions (e.g., countries).

Eventually, at operation 414, a predicted rating associated with the select geographic region is determined by the hardware processor, where the determination can comprise transforming (e.g., mapping) the reference rating (associated with the initial geographic region) to the predicted rating (associated with the select geographic region) based on the rating point value. Additionally, at operation 416, one or more content advisories for the media asset based on the rating point value and the given event type (e.g., defined by an event class and one or more event subclasses).

Further, an overall rating associated with the select geographic region for the media asset is determined by the hardware processor at operation 418 based on one or more predicted ratings determined by operations 404 through 414 (in association with the select geographic region for the media asset) for different event types present in content of the media asset. For example, where operations 404 through 414 determine a plurality of predicted ratings (e.g., PG, PG-13, and R) for different event types present in the content for the current media asset, the overall predicted rating can be determined to be the most restrictive rating in the plurality of predicted ratings (e.g., rating of R under the MPA rating system).

At operation 420, a set of timestamps corresponding to the one or more events of one or more event types (present in content of the media asset) is determined by the hardware processor. For instance, operation 420 can determine and provide a listing of timestamps for events of a specific event type or, more specifically, for events that influence (contribute to) the impact score for the specific event type the most. As noted, the set of timestamps or ranges of timestamps can be used by various utilities used on the media asset, such as compliance reviewing/editing content of the media asset.

At operation 422, the machine learning algorithm (e.g., the ML-based rules engine) used at operation 412 is updated by the hardware processor based on user feedback. For example, with respect to the given event type, the user feedback can comprise an adjustment to the predicted rating determined for the given event type (e.g., providing a more accurate rating) that can be fed back to the machine learning algorithm, which in turn can result in one or more adjustments to the rules of applied by the machine learning algorithm.

Figure 5:
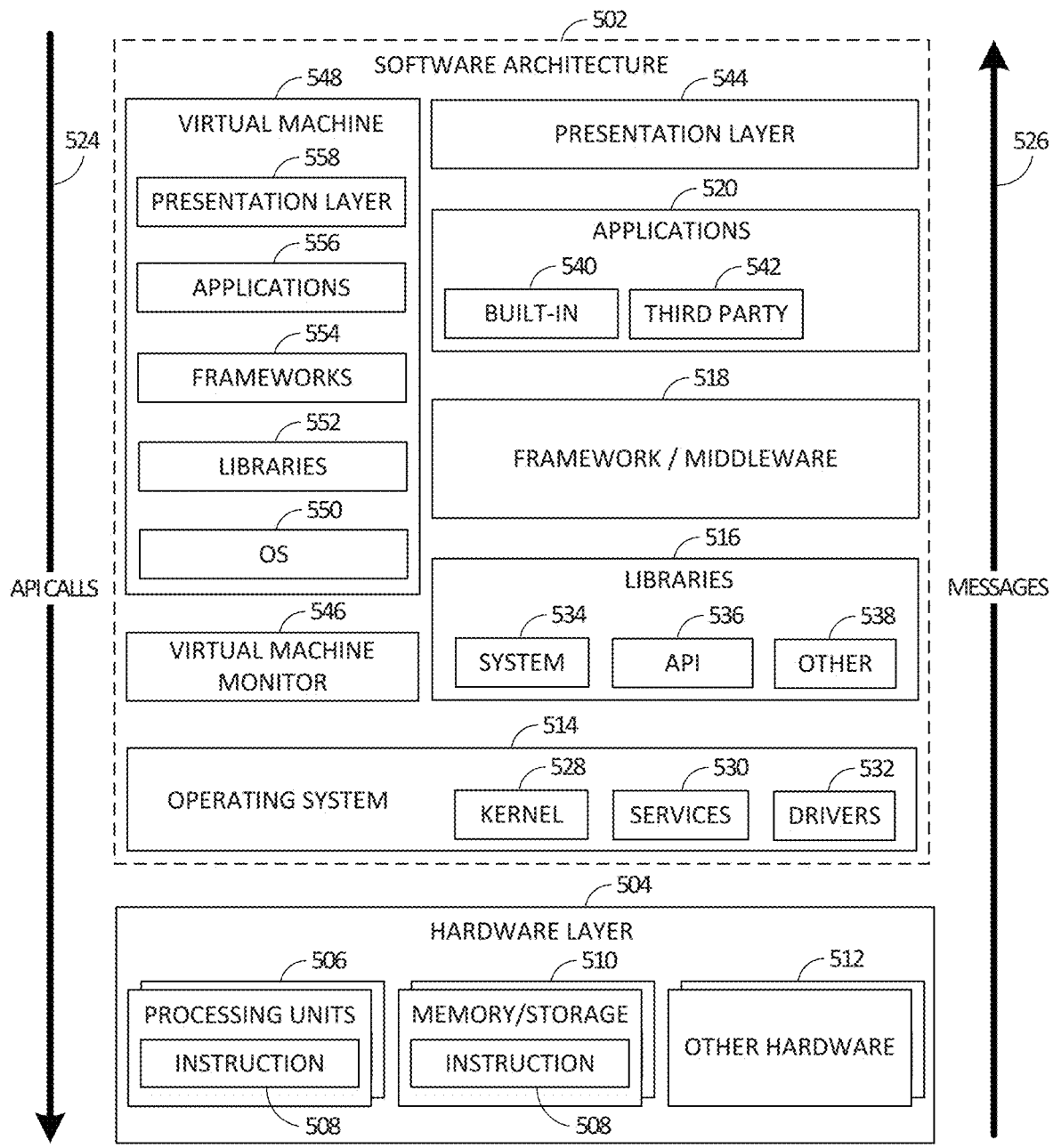
FIG. 5 is a block diagram illustrating a representative software architecture, which may be used in conjunction with various hardware architectures herein described, according to various embodiments of the present disclosure.
Figure 6:
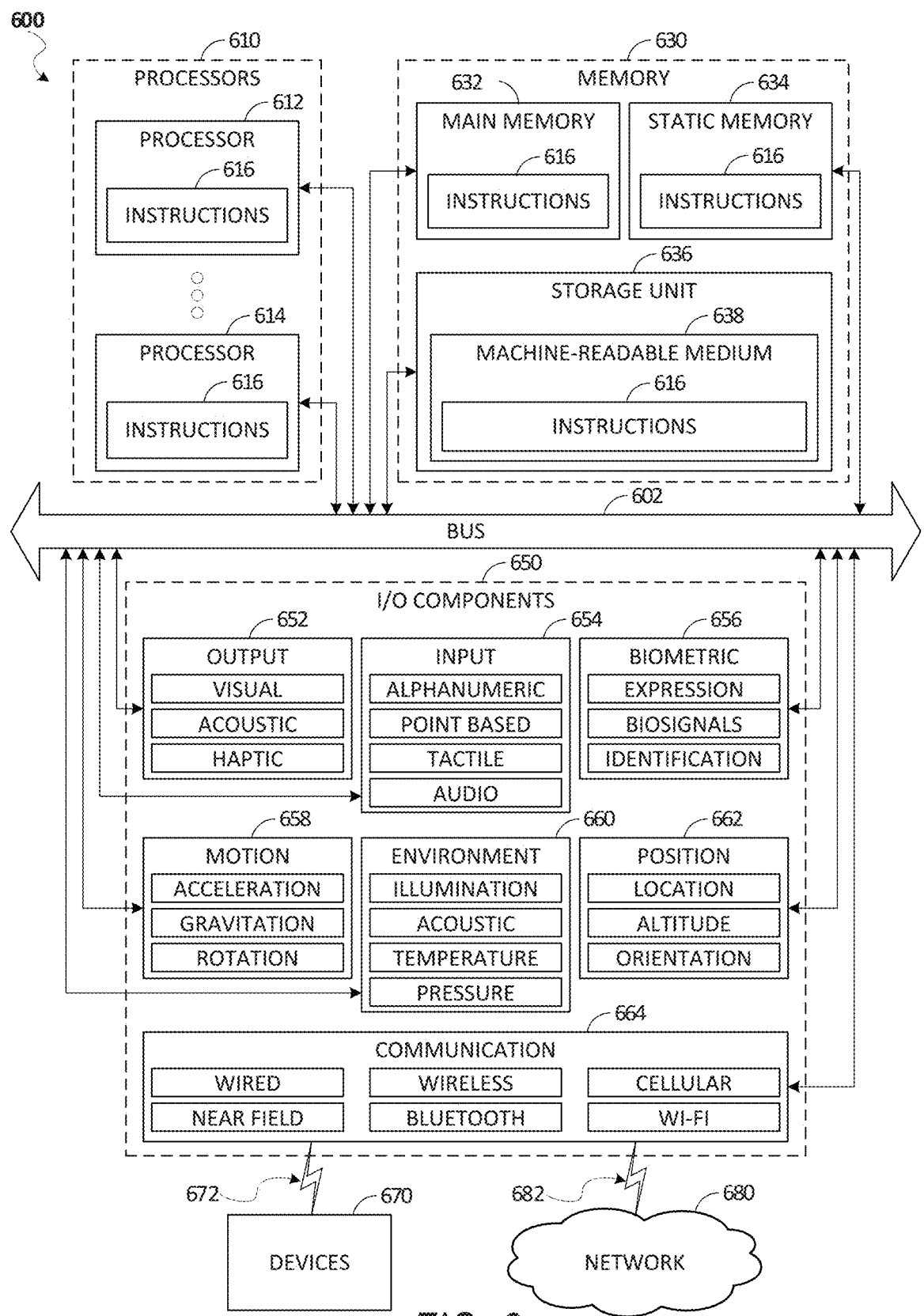
FIG. 6 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 5 or by way of the example machine illustrated by and described with respect to FIG. 6.

FIG. 5 is a block diagram illustrating an example of a software architecture 502 that may be installed on a machine, according to some example embodiments. FIG. 5 is merely a non-limiting example of a software architecture, and it will be appreciated that many other architectures may be implemented to facilitate the functionality described herein. The software architecture 502 may be executing on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 comprises one or more processing units 506 having associated executable instructions 508. The executable instructions 508 represent the executable instructions of the software architecture 502. The hardware layer 504 also includes memory or storage modules 510, which also have the executable instructions 508. The hardware layer 504 may also comprise other hardware 512, which represents any other hardware of the hardware layer 504, such as the other hardware illustrated as part of the machine 600.

In the example architecture of FIG. 5, the software architecture 502 may be conceptualized as a stack of layers, where each layer provides particular functionality. For example, the software architecture 502 may include layers such as an operating system 514, libraries 516, frameworks/middleware 518, applications 520, and a presentation layer 544. Operationally, the applications 520 or other components within the layers may invoke API calls 524 through the software stack and receive a response, returned values, and so forth (illustrated as messages 526) in response to the API calls 524. The layers illustrated are representative in nature, and not all software architectures have all layers. For example, some mobile or special-purpose operating systems may not provide a frameworks/middleware 518 layer, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than by interfacing directly with the underlying operating system 514 functionality (e.g., kernel 528, services 530, or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks/middleware 518 (also sometimes referred to as middleware) may provide a higher-level common infrastructure that may be utilized by the applications 520 or other software components/modules. For example, the frameworks/middleware 518 may provide various graphical user interface functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a home application, a contacts application, a browser application, a book reader application, a location application, a media application, a messaging application, or a game application.

The third-party applications 542 may include any of the built-in applications 540, as well as a broad assortment of other applications. In a specific example, the third-party applications 542 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 542 may invoke the API calls 524 provided by the mobile operating system such as the operating system 514 to facilitate functionality described herein.

The applications 520 may utilize built-in operating system functions (e.g., kernel 528, services 530, or drivers 532), libraries (e.g., system libraries 534, API libraries 536, and other libraries 538), or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with the user.

Some software architectures utilize virtual machines. In the example of FIG. 5, this is illustrated by a virtual machine 548. The virtual machine 548 creates a software environment where applications/modules can execute as if they were executing on a hardware machine (e.g., the machine 600 of FIG. 6). The virtual machine 548 is hosted by a host operating system (e.g., the operating system 514) and typically, although not always, has a virtual machine monitor 546, which manages the operation of the virtual machine 548 as well as the interface with the host operating system (e.g., the operating system 514). A software architecture executes within the virtual machine 548, such as an operating system 550, libraries 552, frameworks/middleware 554, applications 556, or a presentation layer 558. These layers of software architecture executing within the virtual machine 548 can be the same as corresponding layers previously described or may be different.

FIG. 6 illustrates a diagrammatic representation of a machine 600 in the form of a computer system within which a set of instructions may be executed for causing the machine 600 to perform any one or more of the methodologies discussed herein, according to an embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 400 described above with respect to FIG. 4. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an embodiment, the processors 610 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 632, a static memory 634, and a storage unit 636 including machine-readable medium 638, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 650 may include biometric components 656, motion components 658, environmental components 660, or position components 662, among a wide array of other components. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 600 including processors 610), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 630, 632, 634, and/or the memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 680 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
accessing, by a hardware processor, contextual data for a current media asset having a reference rating associated with an initial geographic region, the contextual data describing a set of events within content data of the current media asset;
generating, based on the contextual data and by the hardware processor, a plurality of predicted ratings for a set of given event types present in the set of events, the generating of the plurality of predicted ratings comprising:
accessing a set of cultural inference rules for the set of given event types, the set of cultural inference rules being associated with a first geographic region;
generating a set of impact scores corresponding to the set of given event types based on one or more first cultural inference rules from the set of cultural inference rules;
using a machine learning algorithm to generate a set of rating point values corresponding to the set of given event types for the first geographic region based on the set of impact scores; and
determining the plurality of predicted ratings associated with the first geographic region by transforming the reference rating to the plurality of predicted ratings based on the set of rating point values; and
generating, based on the plurality of predicted ratings and by the hardware processor, an overall rating for the current media asset and associated with the first geographic region.

2. The method of claim 1, wherein the generating of the plurality of predicted ratings comprising:
determining a set of frequency weight values corresponding to the set of given event types based on frequencies at which the set of events of different event types occur within the content data and based on one or more second cultural inference rules from the set of cultural inference rules, the generating of the set of impact scores corresponding to the set of given event types being based on the set of frequency weight values and the one or more first cultural inference rules.

3. The method of claim 2, wherein the one or more second cultural inference rules comprises a frequency threshold that determines a weight value based on a frequency of an event type.

4. The method of claim 1, wherein the generating of the plurality of predicted ratings comprising:
determining a set of intensity values corresponding to the set of given event types based on the set of events and one or more second cultural inference rules from the set of cultural inference rules, the generating of the set of impact scores corresponding to the set of given event types being based on the set of intensity values and the one or more first cultural inference rules.

5. The method of claim 4, wherein the one or more second cultural inference rules defines how an intensity value is determined based on intervals between, or repetition of, events of an event type.

6. The method of claim 1, wherein the reference rating is one predicted for the initial geographic region.

7. The method of claim 1, wherein the contextual data is generated based on an online questionnaire completed for the current media asset by a human reviewer.

8. The method of claim 1, wherein the contextual data is generated based on a source for catalog content for media assets.

9. The method of claim 1, wherein the set of cultural inference rules is accessed from a graph database.

10. The method of claim 1, wherein the contextual data describes a set of event classification labels determined for the set of events and a set of event subclassification labels determined for the set of events, and wherein a select event type of a select event in the set of events is defined by a combination of a select event classification label associated with the select event and a select event subclassification label associated with the select event.

11. The method of claim 1, wherein a cultural inference rule, of the one or more first cultural inference rules, determines how at least one of a frequency weight value or an intensity value is used to generate an impact score.

12. The method of claim 1, wherein the machine learning algorithm comprises a machine learning-based rules engine.

13. The method of claim 1, comprising:
determining a content advisory for the current media asset based on at least one rating point value from the set of rating point values and at least one event type from the set of given event types.

14. The method of claim 1, comprising:
determining, by the hardware processor, a set of timestamps corresponding to the set of events.

15. The method of claim 1, comprising:
receiving a user feedback for at least one predicted rating in the plurality of predicted ratings; and
updating the machine learning algorithm based on the user feedback.

16. A system comprising:
a memory storing instructions; and
one or more hardware processors communicatively coupled to the memory and configured by the instructions to perform operations comprising:
accessing contextual data for a current media asset having a reference rating associated with an initial geographic region, the contextual data describing a set of events within content data of the current media asset;
generating, based on the contextual data, a plurality of predicted ratings for a set of given event types present in the set of events, the generating of the plurality of predicted ratings comprising:
accessing a set of cultural inference rules for the set of given event types, the set of cultural inference rules being associated with a first geographic region;
generating a set of impact scores corresponding to the set of given event types based on one or more first cultural inference rules from the set of cultural inference rules;
using a machine learning algorithm to generate a set of rating point values corresponding to the set of given event types for the first geographic region based on the set of impact scores; and
determining the plurality of predicted ratings associated with the first geographic region by transforming the reference rating to the plurality of predicted ratings based on the set of rating point values; and
generating, based on the plurality of predicted ratings, an overall rating for the current media asset and associated with the first geographic region.

17. The system of claim 16, wherein the generating of the plurality of predicted ratings comprising:

determining a set of frequency weight values corresponding to the set of given event types based on frequencies at which the set of events of different event types occur within the content data and based on one or more second cultural inference rules from the set of cultural inference rules, the generating of the set of impact scores corresponding to the set of given event types being based on the set of frequency weight values and the one or more first cultural inference rules.

18. The system of claim 17, wherein the one or more second cultural inference rules comprises a frequency threshold that determines a weight value based on a frequency of an event type.

19. The system of claim 16, wherein the generating of the plurality of predicted ratings comprising:

determining a set of intensity values corresponding to the set of given event types based on the set of events and one or more second cultural inference rules from the set of cultural inference rules, the generating of the set of impact scores corresponding to the set of given event types being based on the set of intensity values and the one or more first cultural inference rules.

20. The system of claim 19, wherein the one or more second cultural inference rules defines how an intensity value is determined based on intervals between, or repetition of, events of an event type.

21. A non-transitory computer-readable medium comprising instructions that, when executed by a hardware processor of a device, cause the device to perform operations comprising:

accessing contextual data for a current media asset having a reference rating associated with an initial geographic region, the contextual data describing a set of events within content data of the current media asset;

generating, based on the contextual data, a plurality of predicted ratings for a set of given event types present in the set of events, the generating of the plurality of predicted ratings comprising:

accessing a set of cultural inference rules for the set of given event types, the set of cultural inference rules being associated with a first geographic region;

generating a set of impact scores corresponding to the set of given event types based on one or more first cultural inference rules from the set of cultural inference rules;

using a machine learning algorithm to generate a set of rating point values corresponding to the set of given event types for the first geographic region based on the set of impact scores; and determining the plurality of predicted ratings associated with the first geographic region by transforming the reference rating to the plurality of predicted ratings based on the set of rating point values; and generating, based on the plurality of predicted ratings, an overall rating for the current media asset and associated with the first geographic region.

* * * * *